(12) United States Patent
Schell et al.

(10) Patent No.: US 6,917,485 B2
(45) Date of Patent: Jul. 12, 2005

(54) DYNAMIC HEAD SWITCH TIMING RECALIBRATION APPARATUS AND METHOD

(75) Inventors: David Louis Schell, Fort Collins, CO (US); Chris Thomas Settje, Westminster, CO (US); Steven Alan Koldewyn, Berthoud, CO (US); Kar Wei Koay, Lafayette, CO (US); Abhay T. Kataria, Longmont, CO (US); Marinko Bosnich, Berthoud, CO (US); Mike E. Baum, Longmont, CO (US)

(73) Assignee: Seagate Technology LLC, Scotts Valley, CA (US)

( * ) Notice: Subject to any disclaimer, the term of this patent is extended or adjusted under 35 U.S.C. 154(b) by 143 days.

(21) Appl. No.: 10/600,789

(22) Filed: Jun. 20, 2003

(65) Prior Publication Data

US 2004/0150904 A1 Aug. 5, 2004

Related U.S. Application Data

(60) Provisional application No. 60/445,316, filed on Feb. 5, 2003.

(51) Int. Cl.[7] .............................................. G11B 5/09
(52) U.S. Cl. ............................. 360/51; 360/53; 360/63
(58) Field of Search ............................ 360/51, 53, 31, 360/61–63

(56) References Cited

U.S. PATENT DOCUMENTS

| | | |
|---|---|---|
| 3,750,121 A | 7/1973 | Lee |
| 4,890,172 A | 12/1989 | Watt et al. |
| 5,182,685 A | 1/1993 | Krause et al. |
| 5,227,930 A | 7/1993 | Thanos et al. |
| 5,357,384 A | 10/1994 | Tsuyuguchi et al. |
| 5,408,369 A | 4/1995 | Miura et al. |
| 5,412,519 A | 5/1995 | Buettner et al. |
| 5,491,595 A | 2/1996 | Alsborg et al. |
| 5,559,765 A | 9/1996 | Andou |
| 6,091,564 A | 7/2000 | Codilian et al. |
| 6,101,061 A | 8/2000 | Goker |
| 6,118,608 A | 9/2000 | Kakihara et al. |
| 6,118,609 A * | 9/2000 | Gong .......................... 360/61 |
| 6,175,458 B1 * | 1/2001 | Carlson ....................... 360/51 |
| 6,198,584 B1 | 3/2001 | Codilian et al. |
| 6,342,985 B1 | 1/2002 | Clare et al. |
| 6,493,165 B1 | 12/2002 | Satoh et al. |
| 6,493,174 B1 | 12/2002 | Stubbs |
| 2002/0191325 A1 | 12/2002 | Smith et al. |

FOREIGN PATENT DOCUMENTS

EP 0 665 535 B1 4/2002

* cited by examiner

Primary Examiner—Alan T. Faber
(74) Attorney, Agent, or Firm—Davik K. Lucente; Derek J. Berger

(57) ABSTRACT

An apparatus and method for dynamic head switch timing recalibration are provided. With the apparatus and method, a determination is made as to whether a difference in a reference head switch timing and the head switch timing at a later time is sufficient to meet a certain criteria. If the difference meets the criteria, a recalibration of the head switch timing is performed. For example, in a preferred embodiment, the criteria is a number of address mark (AM) misses during a head switch operation. If this predetermined number of AM misses is detected, then it is determined that a recalibration is necessary since the predetermined number of AM misses is an indication that the head switch timing has changed significantly from the reference head switch timing.

16 Claims, 2 Drawing Sheets

DYNAMIC HEAD SWITCH TIMING RECALIBRATION APPARATUS AND METHOD

CROSS REFERENCE TO RELATED APPLICATIONS

This application claims the benefit of U.S. Provisional Application No. 60/445,316, filed Feb. 5, 2003, entitled "Field Head Switch Timing Recalibration."

FIELD OF THE INVENTION

The present invention relates generally to dynamic head switch timing in disc drives. More particularly, the present invention relates to an apparatus and method for performing dynamic head switch timing recalibration by resetting the head switch time between all surfaces of the disc drive to the center of an address marker detect search window when it is determined that the disc drive has missed a predetermined number of address markers during a head switch.

BACKGROUND OF THE INVENTION

Disc drives are commonly used in workstations, personal computers, laptops and other computer systems to store large amounts of data in a form that can be made readily available to a user. In general, a disc drive comprises a magnetic disc that is rotated by a spindle motor. The surface of the disc is divided into a series of data tracks. The data tracks are spaced radially from one another across a band having an inner diameter and an outer diameter.

Each of the data tracks extends generally circumferentially around the disc and can store data in the form of magnetic transitions within the radial extent of the track on the disc surface. An interactive element, such as a magnetic transducer, is used to sense the magnetic transitions to read data, or to transmit an electric signal that causes a magnetic transition on the disc surface, to write data. The magnetic transducer includes a read/write gap that contains the active elements of the transducer at a position suitable for interaction with the magnetic surface of the disc. The radial dimension of the gap fits within the radial extent of the data track containing the transitions so that only transitions of the single track are transduced by the interactive element when the interactive element is properly centered over the respective data track.

The magnetic transducer is mounted by a head structure to a rotary actuator arm and is selectively positioned by the actuator arm over a preselected data track of the disc to either read data from or write data to the preselected data track of the disc, as the disc rotates below the transducer. The actuator arm is, in turn, mounted to a voice coil motor that can be controlled to move the actuator arm across the disc surface.

A servo system is typically used to control the position of the actuator arm to insure that the head is properly centered over the magnetic transitions during either a read or write operation. In a known servo system, servo position information is recorded on the disc surface between written data blocks, and periodically read by the head for use in a closed loop control of the voice coil motor to position the actuator arm. Such a servo arrangement is referred to as an embedded servo system.

In modern disc drive architectures utilizing an embedded servo, each data track is divided into a number of data sectors for storing fixed sized data blocks, one per sector. Associated with the data sectors are a series of servo sectors, generally equally spaced around the circumference of the data track. The servo sectors can be arranged between data sectors or arranged independently of the data sectors such that the servo sectors split data fields of the data sectors.

Each servo sector contains magnetic transitions that are arranged relative to a track centerline such that signals derived from the transitions can be used to determine head position. For example, the servo information can comprise two separate bursts of magnetic transitions, one recorded on one side of the track centerline and the other recorded on the opposite side of the track centerline. Whenever a head is over a servo sector, the head reads each of the servo bursts and the signals resulting from the transduction of the bursts are transmitted to a microprocessor within the disc drive for processing, for example.

When the head is properly positioned over a track centerline, the head will straddle the two bursts, and the strength of the combined signals transduced from the burst on one side of the track centerline will equal the strength of the combined signals transduced from the burst on the other side of the track centerline. The microprocessor can be used to subtract one burst value from the other each time a servo sector is read by the head. When the result is zero, the microprocessor will know that the two signals are equal, indicating that the head is properly positioned.

If the result is other than zero, then one signal is stronger than the other, indicating that the head is displaced from the track centerline and overlying one of the bursts more than the other. The magnitude and sign of the subtraction result can be used by the microprocessor to determine the direction and distance the head is displaced from the track centerline, and generate a control signal to move the actuator back towards the centerline.

Each servo sector also contains encoded information to uniquely identify the specific track location of the head. For example, each track can be assigned a unique number, which is encoded using a Gray code and recorded in each servo sector of the track. The Gray code information is used in conjunction with the servo bursts to control movement of the actuator arm when the arm is moving the head in a seek operation from a current track to a destination track containing a data field to be read or written.

The head structure also includes a slider having an air bearing surface that causes the transducer to fly above the data tracks of the disc surface due to fluid currents caused by rotation of the disc. Thus, the transducer does not physically contact the disc surface during normal operation of the disc drive to minimize wear at both the head and disc surface. The amount of distance that the transducer flies above the disc surface is referred to as the "fly height." By maintaining the fly height of the head at an even level regardless of the radial position of the head, it is ensured that the interaction of the head and magnetic charge stored on the media will be consistent across the disc.

A disc drive is usually made up of multiple discs, or platters, each of which uses two heads to record and read data, one for the top surface of the platter and one for the bottom surface of the platter. The heads that access the platter surfaces are locked together on an assembly of rotary actuator arms. As a result, all the heads move in and out together so that each head is always physically located at the same track number.

Because of this arrangement, often the track location of the heads is not referred to as a track number but rather as a cylinder number. A cylinder is the set of all tracks that all the heads are currently located at. For example, if a disc drive has four platters, it would have eight heads, and cylinder number 400, for example, would be made up of the set of eight tracks, one per platter surface, at track number 400.

Each cylinder contains a number of tracks, each accessible by one of the heads on the drive. To improve efficiency, the disc drive will normally use all of the tracks in a cylinder before going to the next cylinder when doing a sequential read or write since this saves the time required to physically move the heads to a new cylinder. Switching between heads within a cylinder requires a certain amount of time, called the head switch time. This is usually less than the track switch time, and is usually on the order of 100 microseconds to 1 millisecond.

The head switch time is calibrated during the initial certification process of the disc drive. That is, when the disc drive is manufactured, a certification process is performed in which firmware is loaded into the disc driver and various tests are performed on the disc drive to optimize its performance. It is during this certification process that the head switch timing is measured at different locations on the discs so that the disc drive will know how to adjust the timing before any head switch is performed. This assures that no address mark, i.e. a timing reference that identifies the beginning of a servo sector, will be missed during a head switch and that the driver will always know which servo sector it is on.

The address mark is the basis for timing the detection of the other fields of a servo sector, including the Gray code and positioning bursts. Thus, an address mark (AM) detect search window is established for the disc drive which indicates a period of time in which an address mark is expected to be detected. This AM detect search window needs to be kept small so that the probability of a false detection of an AM is kept to a minimum. This means that the variation in timing seen when doing a head switch must be kept small.

Recently it has been discovered that the head switch timing can change considerably from the head switch timing measured during the certification process due to external influences on the disc drive. For example, external forces on the disc drive, such as during mounting of the disc drive in a computing device, may cause flexing of the base plate of the disc drive such that the disc drive is distorted from the state it was in during the certification process. In addition, some disc drives are susceptible to temperature variations which may also cause the base plate of the disc drive to distort. Such distortions cause the timing of the disc drive to be off from the optimized timing determined during the certification process.

In order to compensate for such distortions in timing, the AM detect search window could be increased so that the likelihood that an AM is missed is reduced. However, increasing the AM detect search window increases the likelihood of a false detection of an AM. Moreover, the AM detect search window would need to become excessively large to cover all of the variation that would be seen by the disc drive due to external factors and thus, false detection of an AM would almost be certain.

The present invention provides a solution to this and other problems, and offers other advantages over previous solutions.

SUMMARY OF THE INVENTION

The present invention provides an apparatus and method for head switch timing recalibration. With the apparatus and method of the present invention, a determination is made as to whether a difference in a reference head switch timing and the head switch timing at a later time is sufficient to meet a certain criteria. If the difference meets the criteria, a recalibration of the head switch timing is performed. For example, in a preferred embodiment, the criteria is a number of address mark (AM) misses during a head switch operation. If this predetermined number of AM misses is detected, then it is determined that a recalibration is necessary since the predetermined number of AM misses is an indication that the head switch timing has changed significantly from the reference head switch timing.

In one exemplary embodiment, each head switch operation is monitored to determine if a predetermined number of AMs are missed sequentially. If a predetermined number of AMs are missed in a row during a head switch, it is most probably due to the AM detect search window not opening at the correct time, thereby indicating that there has been a change in the timing of the disc drive and that recalibration is needed. As a result, a head switch recalibration flag is set.

In this exemplary embodiment, when the host process goes to an idle state, the host processor checks the state of the head switch recalibration flag. If the flag is set, then a head switch recalibration process is executed. In one exemplary embodiment, this recalibration process sets the head switch timing between all platter surfaces of the disc drive to the center of the AM detect search window. The new recalibrated values are then checked against the original values obtained through the certification process to make sure that a difference between the original values and the recalibration values is preferably not more than plus or minus half of a servo sector time. If the recalibration values are more than plus or minus half of a servo sector time from the original values, then a servo sector time is either subtracted or added to the recalibration values to bring the recalibration value within plus or minus a half of a servo sector time. This check makes sure that the head switches will always happen on the same AMs that they were set up for during the certification process. Otherwise, there is the potential for slipping a servo sector during head switching and this could cause data integrity issues.

Once the recalibration is complete, the recalibration values (which may or may not have been modified by plus or minus a servo sector time), are saved in their own sector of the disc drive. The original values obtained through the certification process are also maintained in an adaptive area of the disc drive so they can be recalled for the comparison discussed above.

The present invention can be implemented as a computer-readable program storage device which tangibly embodies a program of instructions executable by a computer system to perform a head switch timing recalibration method. In addition, the invention also can be implemented as a head switch timing recalibration apparatus itself. These and various other features as well as advantages which characterize the present invention will be apparent upon reading of the following detailed description and review of the associated drawings.

DETAILED DESCRIPTION

Figure 1:
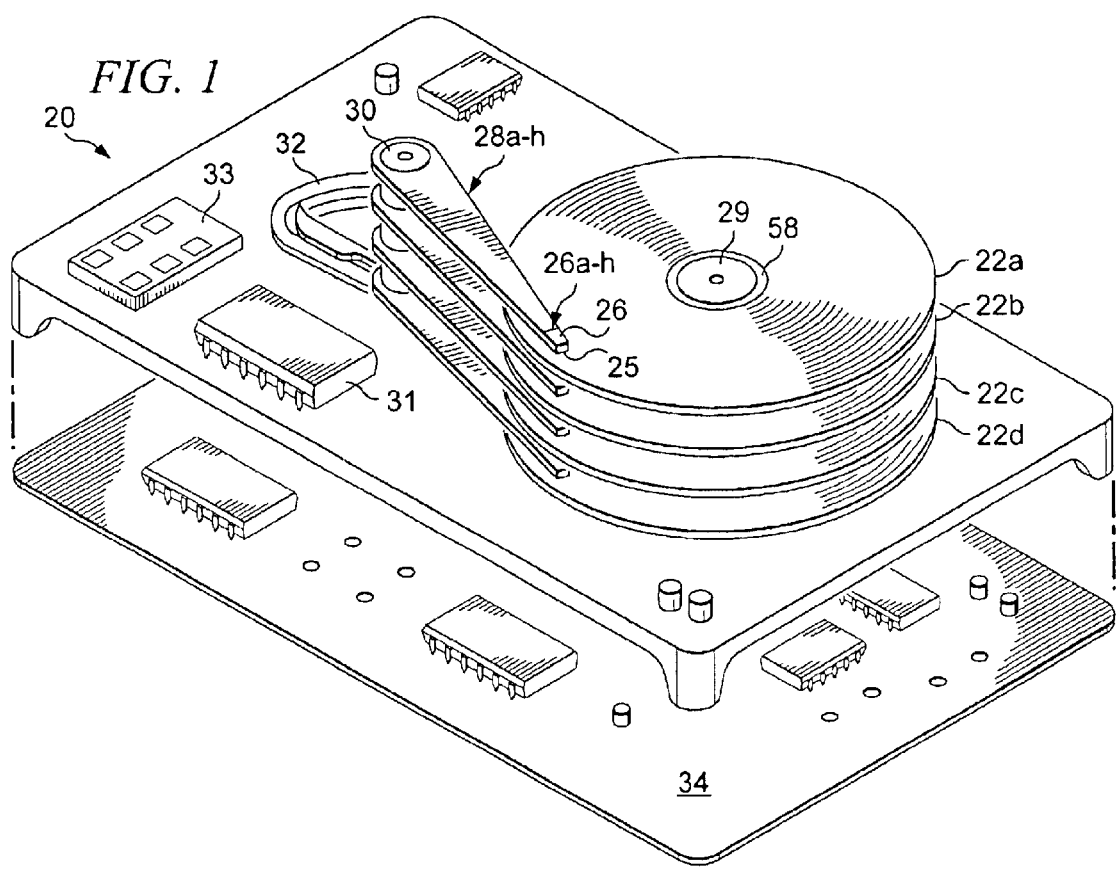
FIG. 1 is an exemplary perspective view of an exemplary disc drive.

Referring now to the drawings, and initially to FIG. 1, there is illustrated an example of a disc drive designated generally by the reference numeral 20. The disc drive 20 includes a stack of storage discs 22a–d and a stack of read/write heads 24a–h. In the depicted example, heads are only shown on the top surface of each platter of the disc driver for simplicity and clarity of the drawing, however, it should be noted that additional heads are typically provided for the bottom surfaces of each platter as well. Each of the storage discs 22a–d is provided with a plurality of data tracks to store user data. As illustrated in FIG. 1, one head is provided for each surface of each of the discs 22a–d such that data can be read from or written to the data tracks of all of the storage discs. The heads are coupled to a preamplifier 31. It should be understood that the disc drive 20 is merely representative of a disc drive system utilizing the present invention and that the present invention can be implemented in a disc drive system including more or less storage discs.

The storage discs 22a–d are mounted for rotation by a spindle motor arrangement 29, as is known in the art. Moreover, the read/write heads 24a–h are supported by respective actuator arms 28a–h for controlled positioning over preselected radii of the storage discs 22a–d to enable the reading and writing of data from and to the data tracks. To that end, the actuator arms 28a–h are rotatably mounted on a pin 30 by a voice coil motor 32 operable to controllably rotate the actuator arms 28a–h radially across the disc surfaces.

Each of the read/write heads 24a–h is mounted to a respective actuator arm 28a–h by a flexure element (not shown) and comprises a magnetic transducer 25 mounted to a slider 26 having an air bearing surface (not shown), all in a known manner. As typically utilized in disc drive systems, the sliders 26 cause the magnetic transducers 25 of the read/write heads 24a–h to "fly" above the surfaces of the respective storage discs 22a–d for non-contact operation of the disc drive system, as discussed above. When not in use, the voice coil motor 32 rotates the actuator arms 28a–h during a contact stop operation, to position the read/write heads 24a–h over a respective landing zone 58 or 60, where the read/write heads 24a–h come to rest on the storage disc surfaces. As should be understood, each of the read/write heads 24a–h is at rest on a respective landing zone 58 or 60 at the commencement of a contact start operation.

A printed circuit board (PCB) 34 is provided to mount control electronics for controlled operation of the spindle motor 29 and the voice coil motor 32. The PCB 34 also includes read/write channel circuitry coupled to the read/write heads 24a–h via the pre-amplifier 31, to control the transfer of data to and from the data tracks of the storage discs 22a–d. The manner for coupling the PCB 34 to the various components of the disc drive is well known in the art, and includes a connector 33 to couple the read/write channel circuitry to the pre-amplifier 31.

Figure 2:
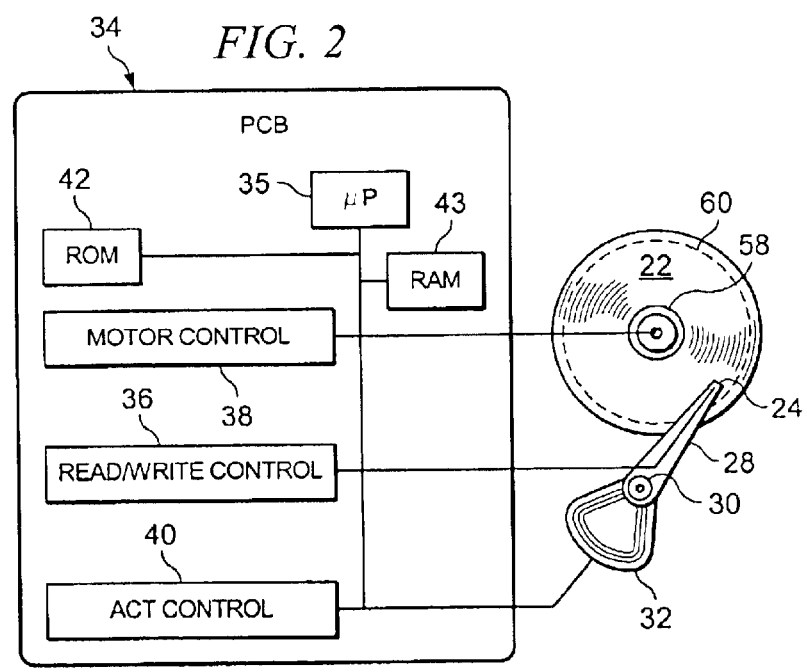
FIG. 2 is an exemplary top plan view of the printed circuit board of the exemplary disc driver of FIG. 1.

Referring now to FIG. 2, there is illustrated in schematic form the PCB 34 and the electrical couplings between the control electronics on the PCB 34 and the components of the disc drive system described above. A microprocessor 35 is coupled to each of a read/write control 36, spindle motor control 38, actuator control 40, ROM 42 and RAM 43. In modern disc drive designs, the microprocessor can comprise a digital signal processor (DSP). The microprocessor 35 sends data to and receives data from the storage discs 22a–d via the read/write control 36 and the read/write heads 24a–h.

The microprocessor 35 also operates according to instructions stored in the ROM 42 to generate and transmit control signals to each of the spindle motor control 38 and the actuator control 40. The spindle motor control 38 is responsive to the control signals received from the microprocessor 35 to generate and transmit a drive voltage to the spindle motor 29 to cause the storage discs 22a–d to rotate at an appropriate rotational velocity.

Similarly, the actuator control 40 is responsive to the control signals received from the microprocessor 35 to generate and transmit a voltage to the voice coil motor 32 to controllably rotate the read/write heads 24a–h, via the actuator arms 28a–h, to preselected radial positions over the storage discs 22a–d. The magnitude and polarity of the voltage generated by the actuator control 40, as a function of the microprocessor control signals, determines the radial direction and radial speed of the read/write heads 24a–h.

When data to be written or read from one of the storage discs 22a–d are stored on a data track different from the current radial position of the read/write heads 24a–h, the microprocessor 35 determines the current radial position of the read/write heads 24a–h and the radial position of the data track where the read/write heads 24a–h are to be relocated. The microprocessor 35 then implements a seek operation wherein the control signals generated by the microprocessor 35 for the actuator control 40 cause the voice coil motor 32 to move the read/write heads 24a–h from the current data track to a destination data track at the desired radial position.

When the actuator has moved the read/write heads 24a–h to the destination data track, a multiplexer (not shown) is used to couple the head 24a–h over the specific data track to be written or read, to the read/write control 36, as is generally known in the art. The read/write control 36 includes a read channel that, in accordance with modern disc drive design, comprises an electronic circuit that detects information represented by magnetic transitions recorded on the disc surface within the radial extent of the selected data track. As described above, each data track is divided into a number of data sectors.

During a read operation, electrical signals transduced by the head from the magnetic transitions of the data sectors are input to the read channel of the read/write control 36 for processing via the pre-amplifier 31. The RAM 43 can be used to buffer data read from or to be written to the data sectors of the storage discs 22a–d via the read/write control 36. The buffered data can be transferred to or from a host computer utilizing the disc drive for data storage.

With the present invention, the microprocessor 35 monitors head switches between heads 24a–h to determine if head switch timing needs to be recalibrated for the disc drive 20. That is, during a head switch between, for example, head 24a and head 24c, the microprocessor 35 determines if a predetermined number of consecutive address marks in the servo sectors of the discs is missed. If a predetermined number of consecutive address marks is missed during the head switch operation, then a determination is made that recalibration is to be performed. In order to better understand the operation of the present invention, it is first beneficial to illustrate an exemplary signal transduced from magnetic transitions on a disc of a disc drive.

Figure 3:
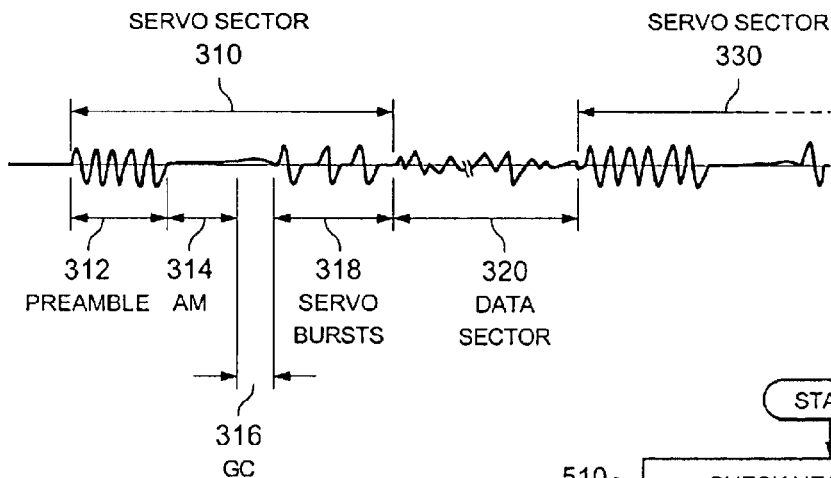
FIG. 3 is an exemplary diagram of signals transduced from magnetic transitions recorded on a data track of a hard disc of a disc drive.

FIG. 3 provides an exemplary diagram of signals transduced from magnetic transitions recorded on a typical data track of a disc. The diagram shows a first servo sector 310 followed by a data sector 320, which is in turn followed by another servo sector 330. This pattern of servo sectors and data sectors continues for the remainder of the data track should the entire data track be read. The servo sectors 310 and 330 are identical in format throughout each track and across all of the tracks. Each servo sector 310 and 330 is also radially aligned with servo sectors of adjacent tracks. Each servo sector 310 includes a preamble field 312, an address mark field 314, Gray code field 316 and servo bursts 318 of the type discussed above for head position control. Because of the radial alignment and similar format, the servo sectors 310 and 330 are coherent, i.e., they are always present regardless of the radial position of the heads relative to the disc.

The preamble field 312 serves as an amplitude reference utilized to normalize an adjustable gain amplifier of the type typically found in a disc drive read channel. The preamble field 312 comprises a series of dibits (a positive peak, followed by a negative peak) and is shown as a sine wave in FIG. 3.

The address mark field (AM field) 314 typically comprises an absence of transitions or a specific data pattern positioned between the preamble field 312 and a first transition of the servo information, i.e. the Gray code 316 and the servo bursts 318 (collectively referred to as "servo information"). Thus, the AM field 314 is detected by monitoring the read channel for a window of silence (no transitions detected; shown as a flat signal in FIG. 3) or a specific data pattern. The AM silence or the specific data pattern extends for a range of between one to four bytes, followed by a first magnetic transition of the Gray code information 316 shown in FIG. 3. The AM field 314 is an asynchronous, absolute timing reference that identifies the beginning of a servo sector and provides the basis for timing the detection of the other fields of the servo sector, including the Gray code 316 and positioning bursts 318.

The Gray code field 316 contains coded information that indicates the track number where the servo sector is located. This information is used to determine the radial position of an actuator during, e.g. a seek operation, by providing a unique identification for each data track on the respective disc surface.

The reliability of servo signal detection is a significant concern to disc drive designers. In order to ensure that the servo sectors are properly processed, the AM field 314 must be precisely and reliably detected to accurately time the location of the Gray code field 316 and servo bursts 318 for head track location and centerline position control. The Gray code field 316 must also be precisely detected for a definitive indication of radial position.

To that end, the servo control system looks for the "silence" corresponding to the absence of transitions or the precise AM pattern as a means for detecting the address mark. This address mark detection is performed based on an address mark (AM) detect search window 350. This AM detect search window 350 identifies a time interval in which an AM should be detected. If an AM is not detected within this time interval, an AM miss determined to have occurred. Occasionally, an AM miss may occur with a properly functioning disc drive. However, when multiple consecutive AMs are missed during a head switch, such a condition is illustrative of a need to recalibrate the timing of the disc drive. That is, the AM detect search window 350 has shifted out of position.

As previously discussed, this shift in the AM detect search window 350 may be due, for example, to external forces applied to the disc drive that causes the base plate to flex and distort from its orientation during the original calibration process. This is especially true for head switch timing in which an added delay is experienced during the switching of processing signals from one head to another.

With the present invention, the microprocessor controller 35 of the disc drive monitors all head switch operations to determine if a predetermined number, such as three, AMs are missed consecutively during the head switch operation. That is, in a preferred embodiment, an AM is not detected within three consecutive AM detect search windows during the head switch operation. If three AMs are missed consecutively, the microprocessor controller 35 sets a head switch recalibration request flag indicating that the head switch timing is to be recalibrated. This flag may be, for example, a bit that is set in the RAM 43 indicating recalibration is necessary.

Mechanisms for detecting AMs and determining AM misses during head switch operations are generally known in the art. These mechanisms are augmented by the present invention to include logic for maintaining a count of the number of AM misses experienced during a head switch operation and logic that determines if there have been a predetermined number of missed AMs during a head switch operation. For example, the microprocessor 35 may store a count of the number of AM misses in RAM 43 and compare the count to a threshold stored in RAM 43 or ROM 42. The logic further sets a head switch recalibration request bit in RAM 43 if it is determined that the predetermined number of missed AMs has been reached. Alternatively, the recalibration request bit, the count of missed AMs and/or the threshold (or predetermined number) of missed AMs may be stored in the microprocessor register.

In addition to the identification of a predetermined number of missed AMs and the setting of a head switch recalibration request bit, the microprocessor controller 35 is further provided with logic for performing a recalibration of the head switch timing values for the platter surfaces of the disc drive. This logic involves checking the head switch recalibration request bit when the microprocessor 35 has an idle cycle. If the head switch recalibration request bit is set, the microprocessor 35 sets the head switch timing values for all of the surfaces of the disc drive to the center of the AM detect search window. The microprocessor 35 then calculates the difference between these new head switch timing values and the original head switch timing values obtained from the calibration and optimization of the disc drive. These original values are stored either in ROM 42 or in an adaptive area of the disc drive. The adaptive area is the set of data sectors stored on the disc that are read when the drive is first powered up. These sectors contain all of the calibration information from when the drive was calibrated through the certification process.

The absolute value of the difference is then compared to a threshold. In a preferred embodiment, this threshold is one half of a servo sector time. Thus, if the difference is greater than one half of a servo sector time, an adjustment to the new head switch timing is applied. In a preferred embodiment, this adjustment is the addition or subtraction of one servo sector time, based on whether the sign for the difference is negative or positive. That is, if the original head switch timing value is subtracted from the new head switch timing value, and the difference is a negative value greater than one half of a servo sector time, one servo sector time is added to the new head switch timing value. Similarly, if the original head switch timing value is subtracted from the new head switch timing value, and the difference is a positive value greater than one half of a servo sector timing, one servo sector time is subtracted from the new head switch timing value. The servo sector timing value may be obtained from calibration information, obtained during the certification process, stored in the ROM 42 or in an adaptive area of the disc, for example.

Keeping the new head switch timing values within a servo sector timing of the original head switch timing values ensures that the head switches will always happen on the same AMs that they were set up for during the certification process. If the new head switch timing values were allowed to be greater than one servo sector timing of the original head switch timing values, a potential for slipping a servo sector during head switches is created and this may cause data integrity issues. Once the recalibration is complete, the new head switch timing values are stored in their own sector on a disc of the disc drive.

As a numerical example of the operation of the present invention, assume that three AMs have been missed during a head switch operation and thus, the head switch recalibration request bit has been set. For this example assume the nominal AM to AM time is 50 microseconds. At the next idle cycle of the microprocessor, the microprocessor will read the head switch recalibration request bit and determine that recalibration is required. As a result of factory calibration, the values for the head switch timing values stored on the discs of the disc drive are 30 microseconds from head 0 to head 1 and 25 microseconds from head 0 to head 2 (different values may be used for each head combination). If the AM detect search window is 1 microsecond then when performing a head switch between head 0 and 1 the drive would expect to find the AM on the new head between 29.5 microseconds and 30.5 microseconds after the AM on head 0. If the AM time on the new head moved to 28 microseconds then 3 AMs would be missed during the head switch. This would cause the recalibration to occur in accordance with the present invention. During the recalibration the new head 0 to head 1 time would be measured at 28 microseconds. The difference between 29.5 microseconds (original value) and 28 microseconds (new value) is 1.5 microseconds, which is less than 25 microseconds (½ nominal AM to AM time) so the 28 microseconds value would be stored as the new head 0 to head 1 head switch time.

The recalibration for a difference of greater than ½ the nominal AM to AM time is illustrated in the following example. Again assume the nominal AM to AM time is 50 microseconds. This time the factory head 0 to head 1 head switch time is 49.5 microseconds. If the head switch time increased to 51 microseconds it would cause three missed AMs resulting in a recalibration. During the recalibration the head 0 to head 1 head switch time would be measured to be 1 microsecond (51−50 microseconds) because the head switch calibration always results in a time greater than or equal to zero and less than nominal AM to AM time. Since the head 0 to head 1 recalibration value minus the reference or factory calibration value is less than minus ½nominal AM to AM time, a full nominal AM to AM time is added to the recalibration value making it 51 microseconds. This will result in the head 0 to head 1 head switch still being associated with the correct AM on the new head. As seen from the above exemplary results, the new head switch timing value is within ½ of one servo sector of the original head switch timing value.

Figure 4:
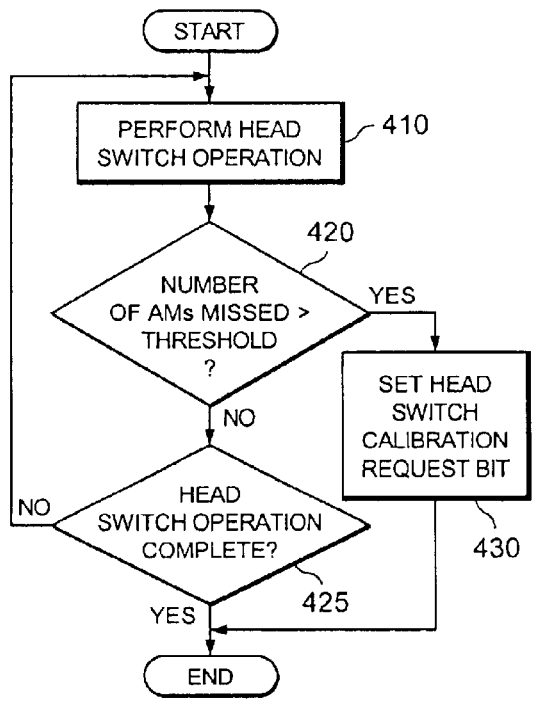
FIG. 4 is a flowchart outlining an exemplary operation of one embodiment of the present invention when determining whether head switch timing recalibration is necessary.
Figure 5:
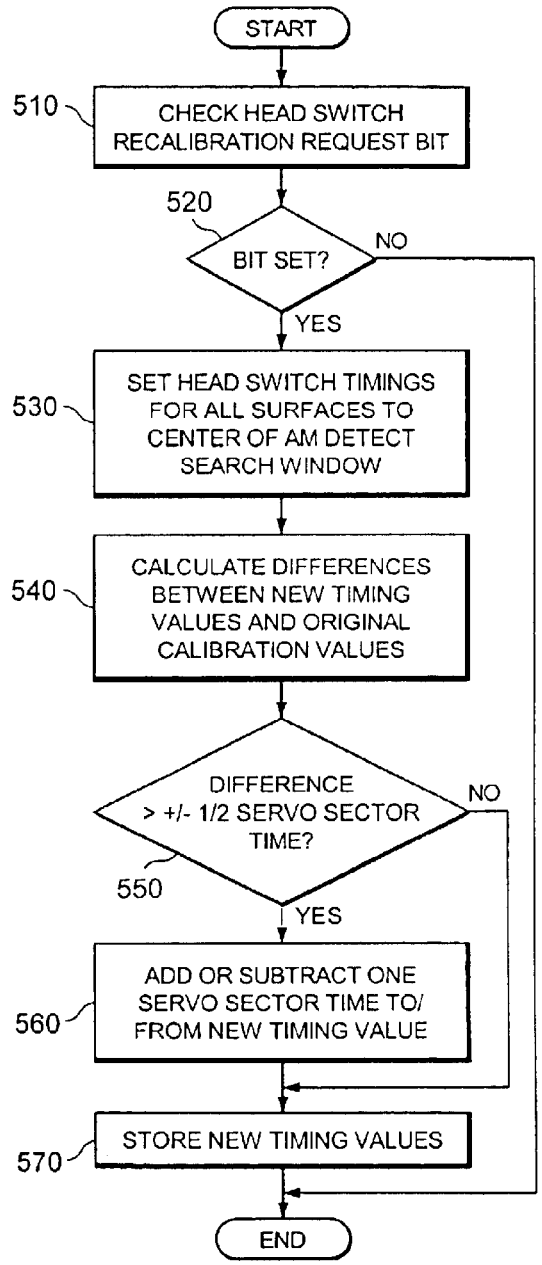
FIG. 5 is a flowchart outlining an exemplary operation of one embodiment of the present invention when recalibrating the head switch timing.

FIGS. 4 and 5 are flowcharts that illustrate a head switch timing recalibration process according to the invention. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

FIG. 4 is a flowchart outlining an exemplary operation of the present invention when determining whether head switch timing recalibration is necessary. The operation shown in FIG. 4 may be performed for each head switch operation performed by the disc drive. That is, each head switch operation performed by the disc drive is monitored to determine if a recalibration of the head switch timing is necessary.

As shown in FIG. 4, the operation starts with a head switch operation being performed (step 410). A determination is made as to whether the number of AMs missed during the head switch operation is equal to or greater than a threshold (step 420). If not, a determination is made as to whether the head switch operation is complete (step 425). If the head switch operation is complete, then the operation terminates; otherwise, the operation returns to step 410. If the number of AMs missed is equal to or greater than the threshold, the a head switch recalibration request bit is set (step 430) and the operation terminates.

FIG. 5 is a flowchart outlining an exemplary operation of the present invention when recalibrating the head switch timing. The operation shown in FIG. 5 is intended to be performed during an idle cycle of a microprocessor controller of the disc drive, for example. However, the present invention is not limited to such and any suitable time for performing the recalibration of the head switch timing may be used without departing from the spirit and scope of the present invention.

As shown in FIG. 5, the operation starts with a check of the head switch recalibration request bit (step 510). A determination is made as to whether this bit has been set (step 520). If the bit has not been set, the operation terminates. Otherwise, if the bit has been set, the head switch timings for all surfaces is reset to the center of the AM detect search window (step 530). A difference between this new head switch timing value and the original calibration head switch timing values is calculated (step 540). A determination is then made as to whether the difference is greater than plus or minus one half of a servo sector time (step 550). If so, one servo sector time is either added or subtracted to/from the new head switch timing value (step 560). Thereafter, or if the difference is not greater than plus or minus one half of a servo sector time, the new head switch timing values are stored (step 570) and the operation terminates.

Thus, the present invention provides a mechanism for dynamically recalibrating head switch timing values for the surfaces of a disc drive. The recalibration of the present invention may be performed at any time after the initial certification process when a head switch operation is determined to have missed a predetermined number of consecutive address marks. The recalibration of the present invention ensures that the recalibrated values are within a tolerance of the original head switch timing values so as to ensure that the head switch operations are performed on the same AMs that they were set up for by the certification process. As a result, the potential for slipping a servo sector during a head switch operation is eliminated.

The head switch recalibration mechanism of the present invention may be embodied in a method, apparatus and/or computer program product for recalibrating the head switch timing of surfaces of a disc drive in response to a determination that the head switch timing has changed significantly from a reference head switch timing. As a method, the present invention determines if a head switch timing of the disc drive has changed from a reference head switch timing such that a recalibration criteria is met and performs recalibration of head switch timing values associated with each surface of the disc drive if the recalibration criteria is met. The recalibration criteria may be, for example, a number of missed address marks during a head switch operation.

The recalibration of the head switch timing values may include, for example, reading a head switch recalibration flag during an idle cycle of the controller and performing the recalibration of the head switch timing values if the head switch recalibration flag is set (the head switch recalibration flag is set in response to determining that the recalibration criteria has been met). The recalibration of the head switch timing may further include setting the head switch timing values to a center of an address mark detection search window to thereby generate new head switch timing values, comparing the new head switch timing values to original head switch timing values to generate a difference, determining if an absolute value of the difference is greater than a threshold, and adjusting the new head switch timing values if the absolute value of the difference is greater than the threshold. The threshold may be, for example, one half of a servo sector time.

The new head switch timing values may be adjusted, for example, by adding or subtracting one servo sector time to or from the new head switch timing values. The new head switch timing values may be stored in a sector on a disc of the disc drive; and the original head switch timing values may be stored in an adaptive area of the disc drive.

While counting missed AMs during a head switch is the preferred method for identifying when a head switch timing recalibration is necessary, other methods of determining that recalibration is needed may be used without departing from the spirit and scope of the present invention. For example, some other methods that may be used may be based on the total time required to complete one or more head switches or if an error recovery algorithm is needed following one or more head switches. The timing method may include determining if the head switch time was longer than the normal head switch time for one or more head switches in a row. The error recovery algorithm may include determining that a preset number of head switches in a row required the disc drive to go into error recovery before the head switch was completed. When such situations are detected, the present invention may be initiated to thereby recalibrate the head switch timing so as to bring the head switch timing back into alignment so that errors in accessing data on the disc drive are reduced.

In other embodiments, the AM to AM time may be measured and compared to the original calibrated value during each head switch operation. Recalibration may be performed if the measured AM to AM time is different from the original calibrated value by more than a predetermined amount. In this way, a type of "early warning system" of sorts is provided that may instigate a recalibration of the head switch timing before an actual failure occurs.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disc, a hard disc drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method comprising:
    determining if a head switch timing has changed from a reference head switch timing such that a recalibration criteria is met; and
    performing recalibration of head switch timing values associated with each of at least two surfaces if the recalibration criteria is met.

2. The method of claim 1, wherein the recalibration criteria is a number of missed address marks during a head switch operation.

3. The method of claim 1, wherein performing recalibration of head switch timing values includes:
    reading a head switch recalibration flag during an idle cycle of the controller; and
    performing the recalibration of the head switch timing values if the head switch recalibration flag is set, wherein the head switch recalibration flag is set in response to determining that the recalibration criteria has been met.

4. The method of claim 2, wherein performing recalibration of head switch timing values includes:

setting the head switch timing values to a center of an address mark detection search window to thereby generate new head switch timing values.

5. The method of claim 4, wherein performing recalibration of head switch timing values includes:

comparing the new head switch timing values to original head switch timing values to generate a difference;

determining if an absolute value of the difference is greater than a threshold; and adjusting the new head switch timing values if the absolute value of the difference is greater than the threshold.

6. The method of claim 5, wherein the threshold is one half of a servo sector time.

7. The method of claim 5, wherein adjusting the new head switch timing values includes:

adding or subtracting one servo sector time to or from the new head switch timing values.

8. The method of claim 5, further comprising:

storing the new head switch timing values in a sector on a disc of a disc drive; and storing the original head switch timing values in an adaptive area of the disc drive.

9. An apparatus for performing head switch timing recalibration in a disc drive, comprising:

means for determining if a head switch timing of the disc drive has changed from a reference head switch timing such that a recalibration criteria is met; and means for performing recalibration of head switch timing values associated with each surface of the disc drive if the recalibration criteria is met.

10. The apparatus of claim 9, wherein the recalibration criteria is a number of address marks missed during a head switch operation.

11. The apparatus of claim 9, wherein the means for performing recalibration of head switch timing values includes:

means for reading a head switch recalibration flag during an idle cycle of the controller; and means for performing the recalibration of the head switch timing values if the head switch recalibration flag is set, wherein the head switch recalibration flag is set in response to determining that the recalibration criteria has been met.

12. The apparatus of claim 10, wherein the means for performing recalibration of head switch timing values includes:

means for setting the head switch timing values to a center of an address mark detection search window to thereby generate new head switch timing values.

13. The apparatus of claim 12, wherein the means for performing recalibration of head switch timing values includes:

means for comparing the new head switch timing values to original head switch timing values to generate a difference;

means for determining if an absolute value of the difference is greater than a threshold; and means for adjusting the new head switch timing values if the absolute value of the difference is greater than the threshold.

14. The apparatus of claim 13, wherein the means for adjusting the new head switch timing values includes:

means for adding or subtracting one servo sector time to or from the new head switch timing values.

15. The apparatus of claim 12, further comprising:

means for storing the new head switch timing values in a sector on a disc of the disc drive; and means for storing the original head switch timing values in an adaptive area of the disc drive.

16. An apparatus comprising at least two transducers and at least two storage surfaces, wherein the apparatus is adapted to determine if a head switch timing has changed from a reference head switch timing such that a recalibration criteria is met and adapted to perform recalibration of head switch timing values associated with each surface if the recalibration criteria is met.

* * * * *